United States Patent [19]

Jacoby

[11] 4,291,581

[45] Sep. 29, 1981

[54] MONITORING EARTH/ROCK MOVEMENTS

[76] Inventor: Charles H. Jacoby, 959 E. Driftwood Dr., Tempe, Ariz. 85283

[21] Appl. No.: 145,429

[22] Filed: May 1, 1980

[51] Int. Cl.³ .......................................... G01N 33/24
[52] U.S. Cl. .................................................... 73/784
[58] Field of Search ............... 73/784, 151; 33/125 R, 33/125 B, 126

[56] References Cited

U.S. PATENT DOCUMENTS

| | | | |
|---|---|---|---|
| 2,292,938 | 8/1942 | Hennessy | 166/64 |
| 3,323,216 | 6/1967 | Ublacker | 33/86 |
| 3,380,167 | 4/1968 | Abel, Jr. et al. | 73/784 X |
| 3,381,750 | 5/1968 | Brown | 166/64 |
| 3,483,745 | 12/1969 | Ublacker | 73/151 |
| 4,044,470 | 8/1977 | Dufrene | 33/125 R |

OTHER PUBLICATIONS

Soiltest Inc., Evanston, Illinois; General Catalog, vol. 2, pp. 124 and 125.
Earth Manual, U.S. Dept. of Interior Bureau of Reclamation, First Edition–2nd Printing, Denver, Colorado 1968, pp. 672–689.

Primary Examiner—Jerry W. Myracle
Attorney, Agent, or Firm—Bean, Kauffman & Bean

[57] ABSTRACT

An improved method and apparatus for monitoring from time to time earth/soil/rock movements. The invention comprises a simplified apparatus for use in a vertically driven hole into an underground earth/strata formation for such purposes; and features use of vertically aligned but spaced apart casing sections in a single bore hole. The casing sections are individually bonded to adjacent strata, whereby movements thereof relative to one another may be monitored by means of a single, repeatedly usable torpedo suspending and subterranean level reading line.

10 Claims, 4 Drawing Figures

MONITORING EARTH/ROCK MOVEMENTS

BACKGROUND AND OBJECTS OF THE INVENTION

This invention relates to an improved method and apparatus for measuring from time to time underground earth/rock shifting conditions so as to monitor for movements therein, by use of measurement means operating in a vertical hole driven into the underground earth/strata. Various techniques for such purposes have been previously set forth in publications known to applicant as follows: U.S. Pat. Nos. 2,292,938; 3,323,216; 3,380,167; 3,381,750; 3,483,745 and 4,044,470; Soiltest Inc., Evanston, Illinois General Catalog Vol. 2, pages 124, 125; and *EARTH MANUAL*, U. S. Department of Interior Bureau of Reclamation, First Edition—Second Printing, Denver, Colorado 1968 at pages 672-689.

As explained in these prior art references, apparatus for such purposes are conventionally titled "extensometers", and are importantly employed in the science of monitoring earth/rock subsidence/shifting mechanics. The results thereof are applied for example to appropriate design, control and maintenance of mining and tunneling operations; dam abutments; roadway supports; and the like.

This invention obviates important inaccuracies in operation which are inherent in the prior art systems, and furthermore provides for such purposes an overall more versatile apparatus; in that a single and repeatedly usable "torpedo" type suspension device may be lowered into a bore hole for accurately monitoring earth/rock shiftings at any number of desired stations linearly of the bore hole. The system of the invention substantially reduces the number of bore holes which are required to monitor the geologic section; and decreases the time/labor/costs required in securing such readings.

THE DRAWING

FIG. 1 of the drawing herewith is a fragmentary, vertical (partially sectional) multi-stage view illustrating schematically the method of the invention and a suitable apparatus therefor;

Figure 3:
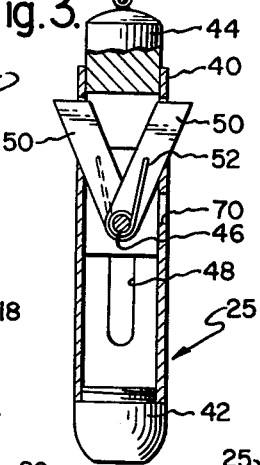
FIG. 3 is a sectional view taken as along line 3—3 of FIG. 2.
Figure 4:
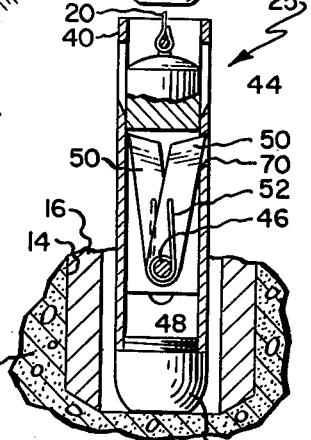

FIG. 4 corresponds to FIG. 3 but illustrates how the torpedo operates when lowered to the bottom of the bore hole.

Figure 1:
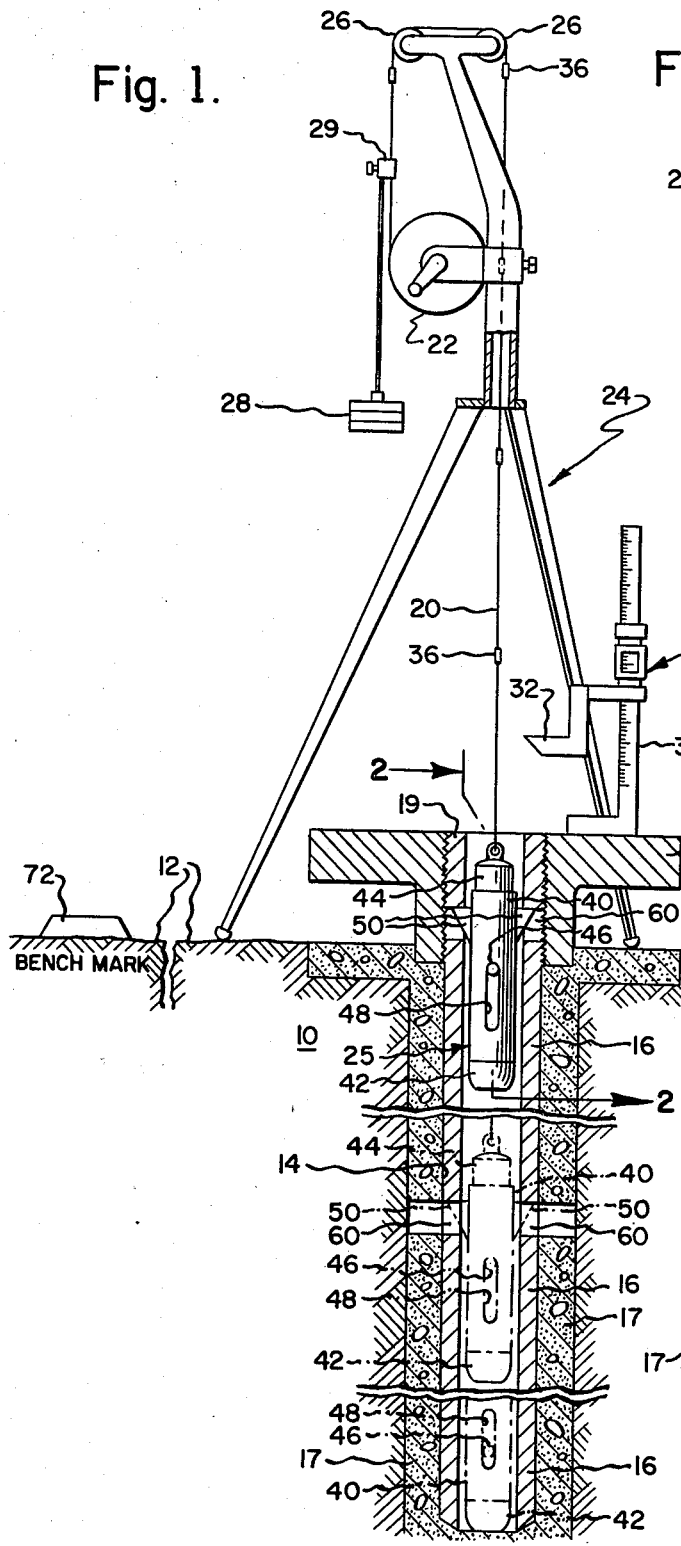

As shown in the accompanying drawing at FIG. 1, the invention may be employed in preferred mode in conjunction with a sub-surface earth/rock formation such as is indicated at 10, which extends downwardly below the ground level 12. A bore hole 14 is driven downwardly through the formation which is to be monitored, and the bore hole is cased as indicated at 16. The casing 16 is then bonded such as by cementing it, as illustrated at 17, throughout its length into fixed relationships with the sub-surface formations which are to be monitored from time to time as to any relative shifting mechanics. A rigid platform such as is shown at 18 may be conveniently fixed to the upper end of the casing 16 such as by means of a pipe flange screw-threaded onto the top end of the casing. A pipe nipple as shown at 19 may then be threaded down inside the flange so as to match the inside diameter of the casing. Note that a space is left between the nipple and the top of the casing 16, for a purpose to be explained hereinafter.

A measuring line formed of steel or any other suitable material in the form of a tape or wire such as is shown at 20 is carried on a reel 22 which is supported over the bore hole as by means of a tripod device 24 or the like. At its free end, the line 20 connects to the upper end of a torpedo such as is designated generally at 25. Intermediately of the torpedo and the reel, the line rides over pulley means 26 carried by the tripod 24. Thus, the torpedo 25 may be lowered into the bore hole by simply unreeling the line. A counterbalance weight 28 is arranged to be detachably clamped to the line as indicated at 29 in order to counterbalance the weight of the torpedo and the suspending portion of the measuring line, in order to keep the line in a constant tension condition throughout the measurement-taking sequences.

Figure 2:
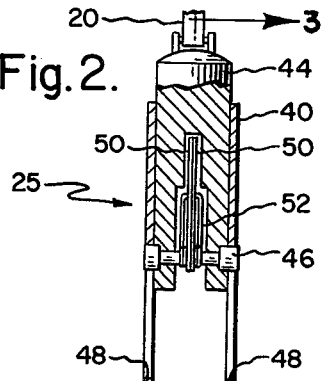
FIG. 2 is a fragmentary, enlarged scale sectional view corresponding to a portion of FIG. 1, illustrating the torpedo apparatus at an initial stage of operation of the system.

As shown, the top surface of the flange 18 is employed as a platform for mounting a calibrated scale 30 which carries in vertically adjustable manner thereon a measuring pointer 32 which is vernier-mounted on the scale 30 as by means of a screw device 34. The line 20 preferably carries thereon marker sleeves 36 such as at each foot interval therealong. Thus, it will be understood that as the torpedo 25 is lowered into the bore hole the depth to which the torpedo resides at any one time may be read on the scale 30. For this purpose, as shown herein, the torpedo device 25 comprises a cylinder 40 which is plugged at its bottom end 42 and slidably carries therein a piston-like armature 44 which is connected at its upper end to the tape 20. As best shown at FIG. 2, the armature 44 is bifurcated and transversely thereof carries a crosspin 46 which extends at its outer ends into slot-shaped apertures 48—48 at opposite sides of the cylinder 40. The crosspin 46 mounts a pair of pawls 50—50 which are spring-biased as by a coil spring 52 so as normally extend outwardly thereof at their upper ends through slots in the cylinder beyond the outer profile thereof, as best shown at FIG. 3.

Following installation of the casing 16 in the bore hole 14, the casing is separated as illustrated at 60 into "windows" 60 by slicing the casing 16 into separate parts by means of any suitable casing cutting tools many of which are well known in the art. The windows 60 are located at various levels in the sub-surface formation, strategically selected according to the nature of the formation; whereby the separate casing members remain bonded to the corresponding sections of the geologic section. Accordingly, upon installation of the monitoring apparatus as shown and described, the torpedo is first lowered into the bore hole to such a depth that the pawls 50—50 spring out into the space 60 between the nipple 19 and the upper end of the casing 16. The suspension line is then partially rewound on the reel 22 so as to tension the upper ends of the pawls 50—50 against the nipple 19. This "starting" position of the torpedo relative to the measuring tape is noted by reading the pointer 32. According to the depth to which this measuring operation is to be performed, the counterweight 28 is clamped to the tape as shown at 29, and is suitably weight-adjusted so as to tension the section of tape between the torpedo and the counterweight to a degree equal to the later-on anticipated tensioning of the tape as the torpedo is to be eventually lowered to the bottom of the bore hole.

Following notation of the measurement taken at the "starting" station the counterweight is detached; the upward pull on the tape is then relaxed and the weight of the torpedo causes it to slide down inside the next lower casing portion while the pawls 50—50 are cammed inwardly of the cylinder against the action of the spring 52. Upon arrival of the torpedo at the next lower "window" 60 the pawls spring outwardly again. The tape is then reeled back so as to pull the top ends of the pawls 50—50 into locked engagements under the ceiling of the "window" as defined by the bottom end of the next above casing member. The counterweight is then reattached to the tape so as to provide the desired tension thereon, and the elevation of the bottom of the next above casing member is then read by means of the pointer 32. The vertical dimension of the window portion 60 of the casing may of course be cut so as to be of any proper length according to circumstances.

As illustrated at FIG. 4, when a series of measurements has been taken linearly of the bore hole the torpedo may then be lowered to the bottom of the bore hole, whereby downward movement of the casing 40 is stopped and the armature 44 descends into the casing to the position shown in FIG. 4. At this point one or more of the pawls 50 are permitted to spring out into a window 70 which is cut through the casing 40, so that the torpedo is now self-contained and may be withdrawn from the bore hole and reset for another series of readings as explained hereinabove.

As illustrated at 72 (FIG. 1), a bench mark is preferably established at some location geographically remote from the mouth of the bore hole so that from time to time the relative elevations of the scale support platform 18 and the bench mark 72 may be checked against possibility that the bore hole platform and casing system may have shifted; thus to permit appropriate measurement corrections to be made.

In lieu of initially lining the bore hole with a single casing or string, and then slicing it into separate members the casing system may be provided by successively lowering into the bore hole separate casing sections and separately bonding them to corresponding strata in spaced apart relation. Thus, it will be appreciated that the invention provides for improved versatility and facility for measuring relative earth/rock movements by means of a repeatedly usable single bore hole suspended torpedo measuring line system.

What is claimed is:

1. The method for monitoring from the earth's surface subterranean strata in situ conditions, to detect interim relative movements thereof, including the steps of:
    forming a bore hole from the surface into said strata;
    installing in said bore hole a casing system based on the mouth of said bore hole comprising a plurality of separate casing members disposed in said bore hole in longitudinally spaced apart relation so as to provide open window spaces therebetween;
    bonding independently of one another said casing members to their corresponding strata sections;
    then passing from time to time a torpedo by means of a calibrated line through said bore hole, said torpedo having pawl means automatically extendible outside of the outside profile thereof whenever said torpedo is lowered to such locations as to permit said pawl means to extend into intercepting relation with the window spaces between said casing members;
    intermediately thereof retracting said torpedo lowering line after each pawl means extending operation, thus bringing said pawl means into firm contact holding relation with the leading end of the preceding casing member, and
    concurrently reading the surveyed positions of the monitored strata sections directly from said torpedo suspension line, whereby the positions to which said separate casing members and their corresponding strata sections may have shifted in the meantime relative to one another may be monitored.

2. The method for monitoring as set forth in claim 1 wherein said casing system is installed by means of a single casing or string of casings into said bore hole and bonding thereto the composite strata;
    slicing said casing system into a plurality of vertically spaced apart separate casing members which are individually bonded to prescribed sections of the strata.

3. The method as set forth in claim 1 wherein a counterweight is employed in combination with said calibrated line to compensate for any elastic elongations thereof.

4. The method as set forth in claim 1 wherein said bore hole is formed in a substantially vertical direction downwardly into a sub-surface strata.

5. The metlhod as set forth in claim 4 wherein a bench mark is established geographically remote from the mouth of said bore hole for surveillance of possible elevational shifting relationships thereof.

6. Apparatus for operating within a bore hole extending from a surface into a strata formation for measuring earth/rock movements therein; said apparatus comprising:
    a bore hole casing system extending from said surface and including a plurality of longitudinally aligned but spaced apart separate casing members bonded to different portions of said formation;
    a platform mounted on the casing member of said system at the entrance of the bore hole;
    a measuring scale carried by said platform to extend therefrom in line with said casing system;
    a measuring pointer carried in adjustable relation on said scale;
    a measuring line extending alongside said pointer and into said bore hole; and
    a torpedo carried by the free end of said measuring line; said torpedo comprising a body having pawl means mounted thereon and having biasing means tending to urge said pawl means to move outwardly beyond the outside profile of said body; said pawl means being so shaped and arranged as to be cammed into said body profile against the action of said biasing means when said torpedo is released to pass into and through any one of said casing members.

7. Apparatus as set forth in claim 6 wherein said bore hole extends downwardly into said formation.

8. Apparatus as set forth in claim 7 wherein a counterweight is provided to be appropriately detachable from said measuring line, in order to compensate for length-of-line elastic extensions thereof under various loadings.

9. Apparatus as set forth in claim 7 wherein said torpedo includes means for automatically sequestering said pawl means within the outside profile thereof whenever said torpedo is lowered in said bore hole so as to abut the closed end thereof.

10. Apparatus as set forth in claim 6 wherein said measuring line comprises a calibrated tape having foot markers attached thereto.

* * * * *